US012613202B2

(12) United States Patent
Kang et al.

(10) Patent No.: US 12,613,202 B2
(45) Date of Patent: Apr. 28, 2026

(54) METHOD FOR EVALUATING SUITABILITY OF NEGATIVE ELECTRODE ACTIVE MATERIAL

(71) Applicant: LG ENERGY SOLUTION, LTD., Seoul (KR)

(72) Inventors: Joon Hyeon Kang, Daejeon (KR); Kyun Il Rah, Daejeon (KR); Se Mi Park, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 237 days.

(21) Appl. No.: 18/714,434

(22) PCT Filed: Sep. 21, 2023

(86) PCT No.: PCT/KR2023/014434
§ 371 (c)(1),
(2) Date: May 29, 2024

(87) PCT Pub. No.: WO2024/090806
PCT Pub. Date: May 2, 2024

(65) Prior Publication Data
US 2025/0020602 A1 Jan. 16, 2025

(30) Foreign Application Priority Data

Oct. 24, 2022 (KR) ........................ 10-2022-0137191

(51) Int. Cl.
*G01N 23/2055* (2018.01)
*H01M 4/02* (2006.01)
(Continued)

(52) U.S. Cl.
CPC ........ *G01N 23/2055* (2013.01); *H01M 4/364* (2013.01); *H01M 4/386* (2013.01);
(Continued)

(58) Field of Classification Search
CPC ...... H01M 4/131; H01M 10/42; H01M 4/386; H01M 4/134; H01M 4/587; H01M 4/364;
(Continued)

(56) References Cited

U.S. PATENT DOCUMENTS

2016/0123906 A1    5/2016  Tessema et al.
2018/0316055 A1   11/2018  Sugeno
(Continued)

FOREIGN PATENT DOCUMENTS

CN         1328805  C    7/2007
JP      2013-98089 A    5/2013
(Continued)

OTHER PUBLICATIONS

Zhou et al. "Tuning charge-discharge induced unit cell breathing in layer-structured cathode materials for lithium-ion batteries", Nature Communications, vol. 5, No. 1, Nov. 18, 2014 (Nov. 18, 2014), pp. 1-8.
(Continued)

*Primary Examiner* — Irakli Kiknadze
(74) *Attorney, Agent, or Firm* — Bryan Cave Leighton Paisner LLP

(57) ABSTRACT

An evaluation method of a negative electrode active material for secondary battery includes measuring an X-ray diffraction of a battery cell stored in a charged state; calculating intensity integrals of extracted diffraction peaks, where the extracted diffraction peaks are extracted from X-ray diffraction peaks for a carbon interlayer compounds and a decomposed products contained respectively in a negative electrode active layer of a negative electrode from the measured X-ray diffraction; calculating a reaction rate constant $k_1$ for the carbon interlayer compounds or a reaction rate constant $k_{-1}$ for the decomposed products of the carbon interlayer compounds from the calculated intensity integral; and evalu-
(Continued)

ating a material suitability of the negative electrode active material contained in the negative electrode active layer based on the calculated reaction rate constant.

18 Claims, 2 Drawing Sheets

(51) Int. Cl.
| | |
|---|---|
| *H01M 4/36* | (2006.01) |
| *H01M 4/38* | (2006.01) |
| *H01M 4/583* | (2010.01) |

(52) U.S. Cl.
CPC ...... *H01M 4/583* (2013.01); *G01N 2223/056* (2013.01); *G01N 2223/1016* (2013.01); *G01N 2223/302* (2013.01); *H01M 2004/027* (2013.01)

(58) Field of Classification Search
CPC ........ H01M 4/133; H01M 4/583; H01M 4/48; H01M 2004/027; H01M 4/525; H01M 10/48; H01M 10/052; H01M 4/505; H01M 10/058; H01M 2004/028; H01M 10/0525; H01M 10/44; H01M 10/4285; H01M 4/62; H01M 4/483; H01M 4/1395; H01M 4/38; H01M 4/36; H01M 4/02; H01M 2004/021; H01M 4/485; H01M 4/625; H01M 4/0404; H01M 4/622; H01M 4/362; H01M 4/0471; H01M 6/181; G01N 23/20; G01N 23/207; G01N 23/2055; G01N 2223/1016; G01N 2223/302; G01N 2223/056; G01N 2223/606; G01N 2223/632; G01N 2223/611; G01N 2223/345; G01N 2223/305; G01N 27/403; G01N 23/20008; Y02E 60/10; C01B 33/113; C01B 33/02; C01P 2002/74; C01P 2002/82; C01P 2004/64; C01G 51/42; C01G 53/44; C01G 53/50; C01G 53/82; B82Y 30/00; B82Y 40/00
USPC ....................................................... 378/62, 71
See application file for complete search history.

(56) References Cited

U.S. PATENT DOCUMENTS

| | | | | |
|---|---|---|---|---|
| 2022/0166052 | A1 | 5/2022 | Saimen | |
| 2024/0021806 | A1* | 1/2024 | Asano | H01M 10/0568 |
| 2024/0109782 | A1* | 4/2024 | Matsuno | C01B 33/32 |
| 2024/0120466 | A1* | 4/2024 | Shin | H01M 10/052 |
| 2024/0290969 | A1* | 8/2024 | Chujo | C01G 49/12 |
| 2024/0351894 | A1* | 10/2024 | Osawa | C01B 33/325 |

FOREIGN PATENT DOCUMENTS

| | | | |
|---|---|---|---|
| JP | 5915083 | B2 | 5/2016 |
| JP | 2017-139089 | A | 8/2017 |
| JP | 6264299 | B2 | 1/2018 |
| KR | 10-2016-0037947 | A | 4/2016 |
| KR | 10-2020-0124513 | A | 11/2020 |
| KR | 10-2021-0146521 | A | 12/2021 |
| WO | 2009/127901 | A1 | 10/2009 |
| WO | 2021241749 | A1 | 12/2021 |

OTHER PUBLICATIONS

Nam et al. "Combining In Situ Synchrotron X-Ray Diffraction and Absorption Techniques with Transmission Electron Microscopy to Study the Origin of Thermal Instability in Overcharged Cathode Materials for Lithium-Ion Batteries", Advanced Functional Materials, vol. 23, No. 8, Jun. 19, 2012 (Jun. 19, 2012), pp. 1047-1063.
Poizot et al. "Nano-sized transition-metal oxides as negative-electrode materials for lithium-ion batteries", Nature 407, Sep. 2000, pp. 496-499.
Liu et al. "Review of Recent Development of In Situ/Operando Characterization Techniques for Lithium Battery Research", Advanced Materials, vol. 31, No. 28, May 17, 2019, 34 pages.

* cited by examiner

[FIG. 1]
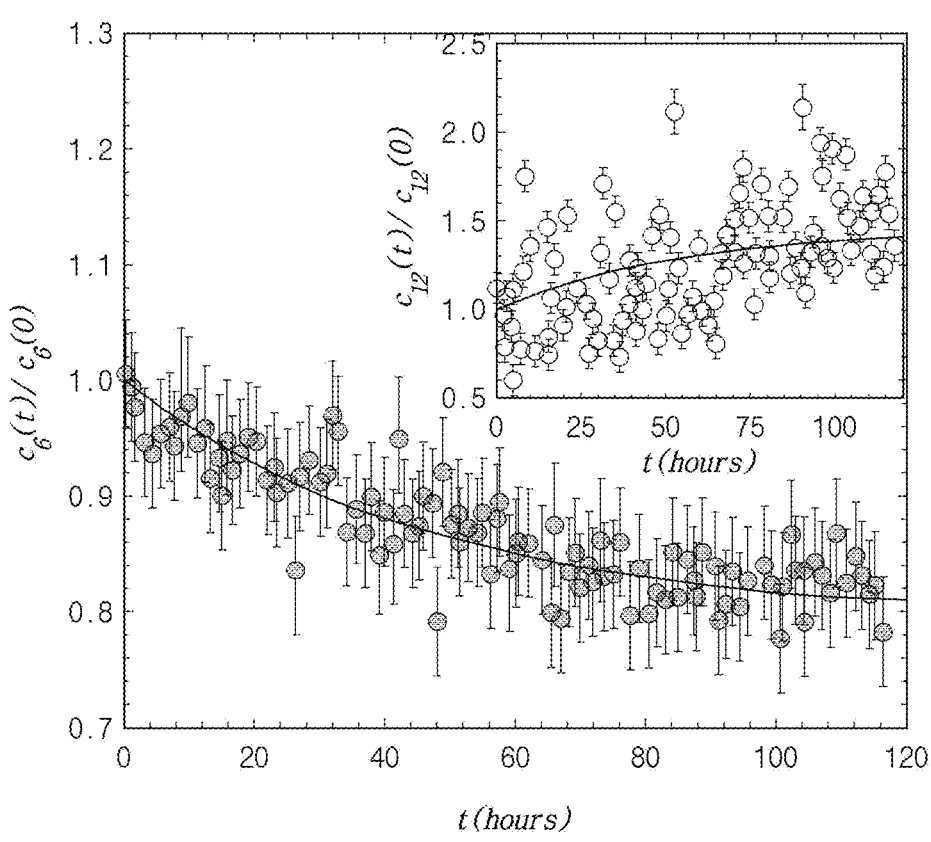

[FIG. 2]
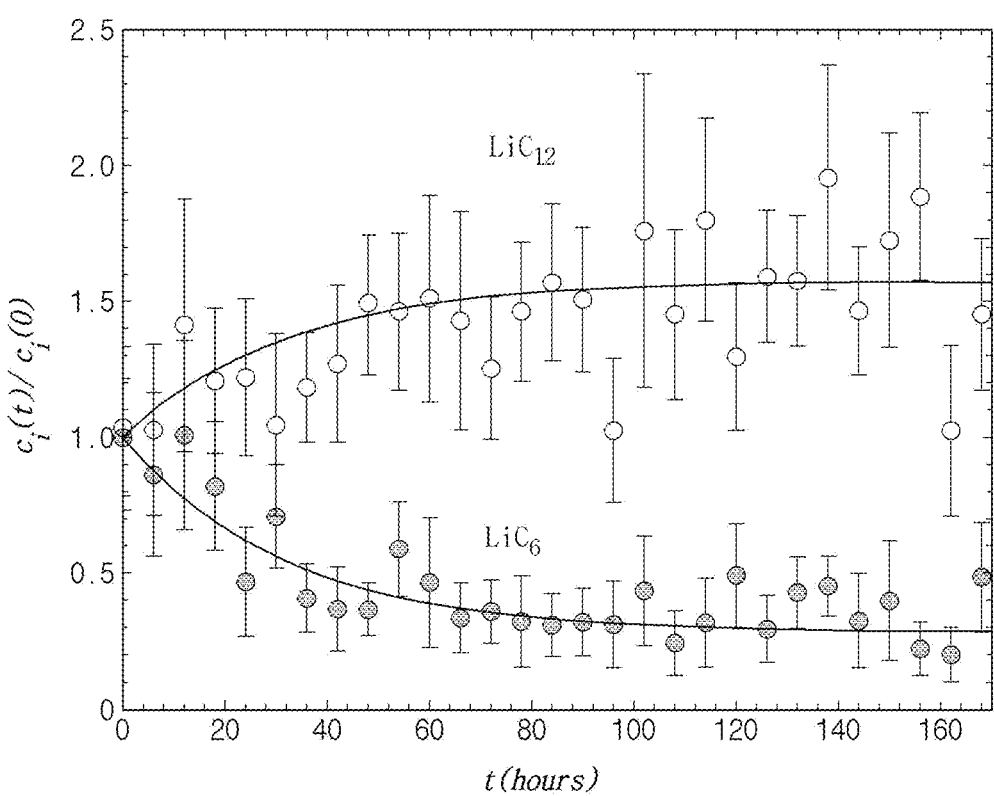

METHOD FOR EVALUATING SUITABILITY OF NEGATIVE ELECTRODE ACTIVE MATERIAL

CROSS-REFERENCE TO RELATED APPLICATION

This application is a National Phase entry pursuant to 35 U.S.C. 371 of International Application PCT/KR2023/014434 filed on Sep. 21, 2023, which claims priority to and the benefit of priority based on Korean Patent Application No. 10-2022-0137191, filed on Oct. 24, 2022, and the entire contents of the Korean patent application are incorporated herein by reference.

TECHNICAL FIELD

The present disclosure relates to an evaluation method for assessing the suitability of a negative electrode active material for a secondary battery, and to a negative electrode that has been determined to be suitable.

BACKGROUND

Conventionally, lithium metal was used as the negative electrode active material for lithium-ion secondary batteries, but when lithium metal is used, there is a risk of short-circuiting the battery due to the formation of dendrites and explosion, so carbon materials are being used as the negative electrode active material instead of lithium metal, which is advantageous in terms of the life and cost of charge and discharge cycles.

Such carbon materials include graphite, which in the charged state has a structure in which lithium ions are embedded in a layered structure, and in the discharged state has a structure in which the lithium ions embedded in the layered structure are deintercalated. Here, in a steady-state battery cell after the initial activation process, the concentration of lithium ions in the graphite in a charged state remains constant. However, if the solid electrolyte interphase (SEI) layer of the battery cell is not fully formed during the initial activation process, or if the electrode contains active materials and/or additives other than carbon materials, side reactions that reduce the concentration of lithium ions in the graphite may occur. In particular, in recent years, in order to improve the energy density, a silicon material containing silicon (Si) is sometimes used as a negative electrode active material by mixing it with graphite in an appropriate mixing ratio along with carbon material. Here, depending on the mixing ratio, particle shape, etc., of the silicon material mixed with the carbon material, the degree of side reactions that reduce the concentration of lithium ions in the graphite varies, which in turn affects the degradation tendency of the battery.

Therefore, in order to develop batteries with excellent performance such as high temperature stability and lifetime characteristics, it is necessary to quantify the extent of side reactions occurring in negative electrode active materials and to develop negative electrode active materials that meet the quantified extent of side reactions. However, in order to do this, there must be a technology that can quantify the degree of side reaction of negative electrode active materials in the battery and judge the performance of the developed negative electrode active materials, but such a technology has not yet been developed, so it is difficult to develop negative electrode active materials that reflect the degree of side reaction of negative electrode active materials.

The background description provided herein is for the purpose of generally presenting context of the disclosure. Unless otherwise indicated herein, the materials described in this section are not prior art to the claims in this application and are not admitted to be prior art, or suggestions of the prior art, by inclusion in this section.

SUMMARY

An aspect of the present disclosure is to provide an evaluation method for non-destructively evaluating the material suitability of a negative electrode in a secondary battery by quantifying the extent of side reactions occurring in the negative electrode, and more particularly in the negative electrode active layer, and a negative electrode for a secondary battery determined to be suitable by the evaluation method.

To address the problems described above,

In an exemplary embodiment, the disclosure describes, an evaluation method of negative electrode active material for secondary battery including:

measuring an X-ray diffraction of a battery cell stored in a charged state;

calculating intensity integrals of extracted diffraction peaks, wherein the extracted diffraction peaks are extracted from X-ray diffraction peaks for a carbon interlayer compounds and a decomposed products contained respectively in a negative electrode active layer of a negative electrode from the measured X-ray diffraction;

calculating the reaction rate constant $k_1$ for the carbon interlayer compound or the reaction rate constant $k_{-1}$ for the decomposed product of the carbon interlayer compound from the calculated intensity integral; and evaluating a material suitability of the negative electrode active material contained in the negative electrode active layer based on the calculated reaction rate constant.

Here, the reaction rate constant $k_1$ and the reaction rate constant $k_{-1}$ may depend on a reaction represented by Chemical Equation 1 below:

$$Li_x C_{6x} \leftrightarrow Li_{x-1} C_{6x} + Li \qquad \text{[Chemical Equation 1]}$$

wherein, in Chemical Equation 1, x is an integer from 2 to 10.

In addition, the reaction rate constant $k_1$ for a carbon interlayer compound may be calculated by fitting the intensity integral of the diffraction peak for the carbon interlayer compound to a following Equation 1:

$$\frac{c_6(t)}{c_6(0)} = 1 - \frac{\alpha\left(1 - e^{-kt}\right)}{c_6(0)\left[1 + \left(\frac{\alpha}{b}\right)e^{-kt}\right]} \qquad \text{[Equation 1]}$$

wherein, in Equation 1, $c_6(0)$ represents an initial concentration of the carbon interlayer compound, $c_6(t)$ represents a concentration of the carbon interlayer compound at time t, a and b represent constants for time, t represents a storage elapsed time, and k represents a effective reaction rate constant.

Moreover, the reaction rate constant $k_{-1}$ for a decomposed product of a carbon interlayer compound may be calculated by fitting the intensity integral of the diffraction peak of the decomposed product to a following Equation 2:

$$\frac{c_{12}(t)}{c_{12}(0)} = 1 + \frac{\alpha\left(1 - e^{-kt}\right)}{c_{12}(0)\left[1 + \left(\frac{\alpha}{b}\right)e^{-kt}\right]} \qquad \text{[Equation 2]}$$

wherein, in Equation 2, $c_{12}(0)$ represents an initial concentration of the decomposed product, $c_{12}(t)$ represents a concentration of the decomposed product at time t, a and b represent constants for time, t represents a storage elapsed time, and k represents a effective reaction rate constant.

Here, a and b of Equation 1 and Equation 2 may be 0 to 1; and 0 to 10, respectively.

In addition, evaluating the material suitability of a negative electrode active material may include:

primarily determining a negative electrode active material of the negative electrode active layer as a suitable material when the calculated reaction rate constants $k_1$ or $k_{-1}$ satisfies a reference value when compared to the reference value, respectively;

calculating an equilibrium constant K from the calculated reaction rate constants $k_1$ or $k_{-1}$; and secondarily determining the negative electrode active material of the negative electrode active layer as a suitable material when the calculated equilibrium constant K satisfies a reference value when compared to the reference value.

Here, the reference value of reaction rate constant $k_1$ and the reference value of reaction rate constant $k_{-1}$ may be 0.1 hour$^{-1}$ or less, respectively.

In addition, the reference value of equilibrium constant K may be 10 or less.

Meanwhile, the carbon interlayer compounds may be compounds bound with a ratio of 5 to 7 moles of carbon atoms to 1 mole of lithium atoms.

As an example, the carbon interlayer compound may be at least one selected from the group comprising of $LiC_6$, $Li_2C_{12}$, $Li_3C_{18}$, $Li_4C_{24}$, $Li_5C_{30}$, and $Li_6C_{36}$.

In addition, the negative electrode may include: one or more of the following carbon-based active materials: graphite, graphene, graphite, carbon nanotubes, carbon black, acetylene black, ketjen black, and carbon fiber; and one or more of the following silicon-based active materials: Si, SiC, and $SiO_x$ (where $0.8 \leq x \leq 2.5$).

Moreover, the storage of the battery cell may be performed below 150° C.

In addition, the negative electrode active material may have a certain range of reaction rate constant $k_1$ reference value and equilibrium constant K reference value depending on the content of the silicon-based active material.

As an example, in the case of including 50 wt. % or less of silicon-based active material based on the total weight of the negative electrode active material, the reference value of the reaction rate constant $k_1$ may be 0.1 hour$^{-1}$ or less; and the reference value of the equilibrium constant K may be 10 or less.

As another example, in the case of including 20 wt. % or less of silicon-based active material based on the total weight of the negative electrode active material, the reference value of the reaction rate constant $k_1$ may be 0.05 hour$^{-1}$ or less; and the reference value of the equilibrium constant K may be 5 or less.

Furthermore, in an exemplary embodiment, the present disclosure provides a negative electrode for secondary battery including:

carbon-based active material and silicon-based active material as a negative electrode active material, and the negative electrode active material determined to be suitable by the aforementioned evaluation method according to the present disclosure.

At this time, the negative electrode active material provided in the negative electrode has a reaction rate constant $k_{-1}$ and an equilibrium constant K in a certain range, so that it can be determined to be suitable in the evaluation method of the present disclosure described above.

Specifically, when the negative electrode active material includes 50 wt. % or less of silicon-based active material based on total weight, the reaction rate constant $k_1$ may be 0.1 hour$^{-1}$ or less and the equilibrium constant K may be 10 or less.

More specifically, when the negative electrode active material includes 20 wt. % or less of silicon-based active material based on total weight, the reaction rate constant $k_1$ of the negative electrode active material is 0.05 hour$^{-1}$ or less and the equilibrium constant K of the negative electrode active material may be 5 or less.

The evaluation method of the negative electrode active material according to the present disclosure quantifies the degree of side reaction of the negative electrode active layer that may occur after activation in a non-destructive manner, so that the material suitability of the negative electrode active material contained in the secondary battery can be determined with high reliability, and the negative electrode active material so determined has the advantage of excellent high temperature stability and excellent life characteristics when applied to a negative electrode.

BRIEF DESCRIPTION OF THE DRAWINGS

FIGS. 1 and 2 are fitted graphs of the change in concentration ratio $(c_6(t)/c_6(0))$ with time t of a carbon interlayer compound in Example 1 and Comparative Example 1, respectively, performed in accordance with the present disclosure.

DETAILED DESCRIPTION

The present disclosure is subject to various modifications and can have many different embodiments, and specific embodiments will be described in detail in the following description.

However, this is not intended to limit the present disclosure to any particular embodiment and should be understood to include all modifications, equivalents, or substitutions that are within the scope of the idea and technology of the present disclosure.

Throughout this specification, it should be understood that terms such as "include" or "have" are intended to indicate that there is a feature, number, step, operation, component, part, or a combination thereof described on the specification, and they do not exclude in advance the possibility of the presence or addition of one or more other features or numbers, steps, operations, components, parts or combinations thereof.

Further, when a portion such as a layer, a film, an area, a plate, or the like is referred to as being "on" another portion, this includes not only the case in which the portion is "directly on" another portion but also the case in which still another portion is interposed therebetween. In contrast, when a portion such as a layer, a film, an area, a plate, or the like is referred to as being "below" another portion, this includes not only the case in which the portion is "directly below" another portion but also the case in which still another portion is interposed therebetween. In addition, to be disposed "on" in the specification of the present disclosure may include the case disposed at the lower portion as well as the upper portion.

Furthermore, in the present disclosure, "comprising as a major component" may mean 50 wt. % or more, 60 wt. % or more, 70 wt. % or more, 80 wt. % or more, 90 wt. % or more, 95 wt. % or more, or 97.5 wt. % or more of the total weight of a composition or a particular component, such as a slurry, and in some cases may mean 100 wt. %, i.e., comprising the entire composition or a particular component.

Hereinafter, the present disclosure will be described in more detail.

Evaluation Method of Negative Electrode Active Material for Secondary Battery

In an exemplary embodiment, the present disclosure describes
  an evaluation method of negative electrode active material for secondary battery including:
  measuring the X-ray diffraction of a battery cell stored in a charged state;
  calculating the intensity integrals of the extracted diffraction peaks, wherein the extracted diffraction peaks are extracted from the measured X-ray diffraction peaks for a carbon interlayer compounds and a decomposed products contained respectively in a negative electrode active layer of a negative electrode;
  calculating the reaction rate constant k1 for the carbon interlayer compound or the reaction rate constant $k_{-1}$ for the decomposed product of the carbon interlayer compound from the calculated intensity integral; and
  evaluating the material suitability of a negative electrode active material contained in a negative electrode active layer based on a calculated reaction rate constant.

A method for evaluating a negative electrode active material for a secondary battery according to the present disclosure is a method for evaluating the suitability of a negative electrode active material applied to a secondary battery, wherein a "negative electrode active material" having electrochemical activity in the negative electrode and/or a "negative electrode active layer" comprising the same as a main component may be subject to evaluation. Further, the "negative electrode active material" may take the form of one or more single substances and/or compositions comprising such substances that induce electrical activity by performing an electrochemical reaction on the negative electrode active layer.

Furthermore, the evaluation method is characterized in that a negative electrode including a negative electrode active layer is manufactured using the negative electrode active material to be evaluated, and a side reaction is quantified after the manufactured negative electrode is fully charged and stored at a high temperature. Specifically, the evaluation method quantifies the degree of side reactions in the negative electrode active layer in the form of reaction rate constants ($k_1$, $k_{-1}$, etc.), equilibrium constants (K), etc., for carbon interlayer compounds and their decomposed products through changes in the concentration of carbon interlayer compounds contained in the active layer of the negative electrode over time during storage of the charged battery cell, and evaluates the negative electrode active material through these. Therefore, the evaluation method has the advantage of evaluating the material suitability of the negative electrode active material contained in the negative electrode of the battery cell in a non-destructive manner with high reliability.

The evaluation method of a negative electrode active material for a secondary battery according to the present disclosure includes measuring X-ray diffraction of a charged and stored battery cell. Measuring the X-ray diffraction of the battery cell is a step of non-destructively analyzing the negative electrode active layer of the negative electrode provided inside the fully charged battery cell, which can be performed by measuring the X-ray diffraction of the stored battery cell at certain time intervals, for example, at intervals of 0.5 to 24 hours, and more specifically at intervals of 5 to 7 hours. In this case, the X-ray diffraction of the battery cell does not include information about the separator or electrolyte of the electrode assembly, which is not crystalline, and may include information about the active material of the positive electrode and/or negative electrode, which is crystalline.

Furthermore, the temperature at which the battery cell is stored may be 150° C. or less, more specifically, 5° C. to 150° C.; 10° C. to 150° C.; 20° C. to 150° C.; 20° C. to 120° C.; 25° C. to 100° C.; 25° C. to 80° C.; 50° C. to 100° C.; 50° C. to 80° C.; 50° C. to 70° C.; 55° C. to 65° C.; or 58° C. to 62° C.

Furthermore, the storage may be carried out for a period of 1 to 10 days, and more specifically for a period of 1 to 9 days; 1 to 7 days; 2 to 6 days; 4 to 8 days; 6 to 8 days; 1 to 5 days; or 2 to 4 days. By storing the battery cell for the periods described above, the present disclosure can induce equilibration of the carbon interlayer compounds and their decomposed products contained in the battery cell.

Furthermore, the evaluation method of negative electrode active materials for secondary batteries according to the present disclosure includes extracting X-ray diffraction peaks for carbon interlayer compounds and their decomposed products contained in the negative electrode active layer from measured X-ray diffraction, respectively, and calculating an intensity integral of the extracted diffraction peaks.

The above step may be performed by extracting the X-ray diffraction peaks for the lithium-inserted carbon interlayer compound and the X-ray diffraction peaks for the decomposed product in which lithium is deintercalated from the interlayer compound, respectively, from the measured X-ray diffraction results, and identifying the intensity of the diffraction peaks that changes by time, finding the integral of the intensity of each identified peak, and plotting it as a function of time.

Here, the intensity of the X-ray diffraction peaks may correspond to the relative concentration of the carbon interlayer compounds and decomposed product thereof contained in the negative electrode active layer, and the plotting of the intensity of the diffraction peaks over time may be indicative of such relative concentration changes.

Further, the evaluation method of negative electrode active material for secondary batteries according to the present disclosure includes the calculating the reaction rate constants $k_1$ and $k_{-1}$ for the carbon interlayer compound and its decomposed products, respectively, from the calculated intensity integral values.

Here, the reaction rate constants $k_1$ and $k_{-1}$ can be obtained by fitting the previously calculated intensity integral values with Equation 1 and Equation 2 below, respectively:

$$\frac{c_6(t)}{c_6(0)} = 1 - \frac{\alpha\left(1 - e^{-kt}\right)}{c_6(0)\left[1 + \left(\frac{\alpha}{b}\right)e^{-kt}\right]} \qquad \text{[Equation 1]}$$

$$\frac{c_{12}(t)}{c_{12}(0)} = 1 + \frac{\alpha\left(1 - e^{-kt}\right)}{c_{12}(0)\left[1 + \left(\frac{\alpha}{b}\right)e^{-kt}\right]} \qquad \text{[Equation 2]}$$

in Equation 1 and Equation 2, $c_6(0)$ represents the initial concentration of a carbon interlayer compound, $c_6(t)$ represents the concentration of a carbon interlayer compound at time t, $c_{12}(0)$ represents the initial concentration of a decomposed product, $c_{12}(t)$ represents the concentration of a decomposed product at time t, a and b represent constants for time, t represents a storage elapsed time, and k represents a effective reaction rate constant.

Equations 1 and 2, respectively, may quantify the degree of side reactions that may occur in the negative electrode active layer during the activation process of a charged battery cell as reaction rates for carbon interlayer compounds and their decomposed products.

Specifically, the carbon-based active material used as the negative electrode active material of the secondary battery includes graphite having a layered structure, wherein the carbon-based active material has a carbon interlayer compound form in which lithium ions are inserted in the layered structure when the battery is charged, and a carbon compound form in which the inserted lithium ions are deintercalated when the battery is discharged.

In this case, a battery cell in a steady state after the initial activation process has a constant concentration of lithium ions in the graphite in the charged state. However, if the electrode contains a silicon-based active material as an active material other than a carbon-based active material, the battery cell may experience a side reaction that reduces the concentration of lithium ions and/or lithium in the graphite during the initial activation process. More specifically, in a charged battery cell after the initial activation process, a carbon interlayer compound ($LiC_x6_x$) inserted with lithium ions may be in equilibrium with a decomposed product ($Li_{x-1}C_{6x}$) in which lithium is deintercalated from the layered structure, as shown in Chemical Equation 1 below. Here, lithium is deintercalated from the carbon interlayer compound as time passes in a charged state condition, some of the deintercalated lithium participates in side reactions, and a significant amount of the side reactions are converted into irreversible reactions that reduce the concentration of the carbon interlayer compound and result in the degradation of the negative electrode active material. The concentration of the carbon interlayer compound may vary depending on the composition of the negative electrode active material, for example, the type and/or percentage of silicon-based active material contained with the carbon-based active material. The present disclosure can quantify the side reactions induced in the negative electrode active layer from the change in concentration of the carbon interlayer compound by different compositions of the negative electrode active material, and the quantified form can be a reaction rate constant for the carbon interlayer compound and the decomposed product in which lithium has been deintercalated from the layered structure:

$$Li_\chi C_{6\chi} \leftrightarrow Li_{\chi-1}C_{6\chi} + Li \qquad \text{[Chemical Equation 1]}$$

in Chemical Equation 1, x is an integer from 2 to 10.

More specifically, the present disclosure is able to calculate the change in concentration of the carbon interlayer compound over time from the decomposition reaction of the carbon interlayer compounds taking place in the negative electrode active layer during use and/or storage of the fully charged battery cell after initial activation, i.e., from the amount of decomposed product in which lithium is deintercalated from the carbon interlayer compound, as shown in Chemical Equation 1 above, which is represented by Equation 3 below:

$$-\frac{dc_6}{dt} = k_1 c_6 - k_{-1} c_{12} c_{Li} \qquad \text{[Equation 3]}$$

in Equation 3, $dc_6/dt$ represents the derivative of the concentration of a carbon interlayer compound with respect to time t, $k_1$ is the rate constant for a forward reaction that produces lithium ions from a decomposed product of a carbon interlayer compound with lithium ions deintercalated from the carbon interlayer compound, $k_{-1}$ is the rate constant for a reverse reaction that produces carbon interlayer compounds from the decomposed product of the carbon interlayer compound and lithium ions, $c_{12}$ represents the concentration of the decomposed product produced by the decomposition of lithium ions from the carbon interlayer compounds, $c_{Li}$ represents the concentration of lithium ions decomposed from carbon interlayer compounds, $c_6$ represents the concentration of carbon interlayer compounds.

Then, to calculate the amount of side reaction at the negative electrode during use and/or storage from Equation 3, wherein the reaction of Chemical Equation 1 is quantified as a change in the concentration of the carbon interlayer compound and its decomposed products, integration and arithmetic operation on Equation 3 can be performed to derive Equation 1, which can predict the amount of concentration change depending on the reaction rate of the carbon interlayer compound contained in the negative electrode active layer of the negative electrode during storage of the fully charged battery cell after activation. The derived Equation 1 represents the reaction rate of the negative electrode active layer of a charged battery cell for carbon interlayer compounds as a function of the degree of side reactions that may occur during use and/or storage after the initial activation process. In this case, the lithium deintercalation reaction rate, $k_1$, is derived from the effective reaction rate constant k for the carbon interlayer compound, and the derived $k_1$ can be used as an indicator to quantify the side reactions occurring in the negative electrode active layer:

$$\frac{c_6(t)}{c_6(0)} = 1 - \frac{\alpha\left(1 - e^{-kt}\right)}{c_6(0)\left[1 + \left(\frac{\alpha}{b}\right)e^{-kt}\right]}$$ [Equation 1]

in Equation 1, $c_6(0)$ represents the initial concentration of the carbon interlayer compound, $c_6(t)$ represents the concentration of the carbon interlayer compound at time t, a and b represent constants for time, t represents the storage elapsed time, and k represents the effective reaction rate constant.

The present disclosure has a configuration of extracting peaks (or spectra) for carbon interlayer compounds and their decomposed products from X-ray diffraction as described above, then calculating intensity integral values for the extracted peaks, and fitting the calculated intensity integral values with Equation 1 to obtain a reaction rate constant, and therefore, has the advantage that the accuracy of the reaction rate constant is significantly higher compared to the case of extracting the diffraction peaks of the carbon interlayer compound from the conventional X-ray diffraction, calculating the integral value of the intensity of the extracted peaks, and obtaining the reaction rate constant from the ratio of the peak integral value at time t ($I_{LiC6}(t)$) to the initial peak integral value ($I_{LiC6}(0)$) from the calculated integral value.

In the same way, Equation 1 can be used to calculate the concentration change with time of the decomposed product in which lithium is deintercalated from the carbon interlayer compound, and by performing integration and arithmetic operation on the calculated equation, Equation 2 can be derived to predict the amount of concentration change according to the reaction rate of the decomposed product contained in the negative electrode active layer during storage of the fully charged battery cell after activation:

$$\frac{c_{12}(t)}{c_{12}(0)} = 1 + \frac{\alpha\left(1 - e^{-kt}\right)}{c_{12}(0)\left[1 + \left(\frac{\alpha}{b}\right)e^{-kt}\right]}$$ [Equation 2]

in Equation 2, $c_{12}(0)$ represents the initial concentration of the decomposed product, $c_{12}(t)$ represents the concentration of the decomposed product at time t, a and b represent constants for time, t represents the storage elapsed time, and k represents the effective reaction rate constant.

In Equations 1 and 2, a and b are constants with respect to time, a may be 0 to 1 and b may be 0 to 10. Specifically, a may be 0 to 1 and b may be 0 to 10, and more specifically, a may be 0 to 0.9; 0.1 to 0.8; or 0.1 to 0.6, and b may be 1 to 9; 2 to 8; or 4 to 6.

As one example, a negative electrode active layer provided in a battery cell according to the present disclosure may contain a carbon-based active material and a silicon-based active material as a negative electrode active material in an amount of 50 to 99 wt. %:1 to 50 wt. % based on a total weight of the negative electrode active material, in which case a and b may be 0.05 to 1.0 and 1 to 10, respectively. Specifically, a of Equation 1 may be 0.1 to 0.6, more specifically 0.1 to 0.5; 0.1 to 0.4; 0.2 to 0.6; 0.2 to 0.5; 0.25 to 0.4; 0.25 to 0.45; 0.3 to 0.42; 0.28 to 0.42; or 0.31 to 0.39.

Furthermore, b in Equation 1 may be 2 to 9, more specifically, 3 to 9; 3 to 7; 4 to 8; 5 to 10; 3 to 8; 1 to 6; 4.5 to 6.0; or 5.0 to 5.5.

The a and b may vary depending on the composition, content, composition, and stabilization state of the negative electrode active layer in which the side reaction of lithium is performed, and by controlling a and b in the ranges described above, the concentration of lithium in which the irreversible reaction is performed, that is, the degree of side reaction of the negative electrode active layer, can be quantified with higher reliability depending on the component, content, composition, and stabilization state of the negative electrode active layer.

Further, the evaluation method of a negative electrode active material for a secondary battery according to the present disclosure includes evaluating the material suitability of the negative electrode active material based on a calculated reaction rate constant.

The above step is a step of determining that the negative electrode active material that induces less side reactions in the negative electrode active layer after the activation process is a material with high material suitability, wherein the determination can be performed by evaluating the material suitability based on the previously calculated reaction rate constant.

More specifically, the above step may include: primarily determining a negative electrode active material of the negative electrode active layer as a suitable material if the calculated reaction rate constants $k_1$ or $k_{-1}$ satisfies the reference values when compared to reference values, respectively; calculating the equilibrium constant K from the calculated reaction rate constants $k_1$ or $k_{-1}$; and secondarily determining a negative electrode active material of the negative electrode active layer as a suitable material if the calculated equilibrium constant K satisfies a reference value when compared to reference value.

The effective reaction rate constant $k_1$ for the carbon interlayer compound in Equation 1 and the effective reaction rate constant $k_{-1}$ for the decomposed product of the carbon interlayer compound in Equation 2, calculated earlier, may vary depending on the degree of stabilization of the carbon interlayer compound contained in the negative electrode active layer; the components contained in the negative electrode active layer, particularly the type and/or content ratio of components other than carbon-based active materials as negative electrode active materials, such as silicon-based negative electrode active materials. In other words, $k_1$ and $k_{-1}$ may vary depending on the component, content, composition, and stabilization state of the negative electrode active layer in which the irreversible reaction of lithium is performed. Therefore, the reaction rate constants $k_1$ and/or $k_{-1}$ are investigated for each composition of the negative electrode active material (specifically, the ratio of components and contents), and among the investigated values, the reaction rate constants $k_1$ and/or $k_{-1}$ when the stabilization state of the negative electrode is high, i.e., when the side reactions are little, are set to the reference values $k_1$ and/or $k_{-1}$ for the corresponding negative electrode active material composition. Then, if the reaction rate constants $k_1$ and $k_{-1}$ calculated from the X-ray diffraction results of the previously fully charged and stored battery cell satisfy the reference values $k_1$ and/or $k_{-1}$, the negative electrode active material inside the X-ray diffraction measured battery cell can be primarily determined to be suitable as a negative electrode material.

In this case, the reference value of the reaction rate constant (i.e., the reference value $k_1$) for the carbon interlayer compound may be 0.1 hour$^{-1}$ or less when the negative electrode active material contains 50 to 100 wt. %:0 to 50 wt. % of carbon-based active material and silicon-based active material based on the total weight of the negative electrode active material. More specifically, when carbon-based active material and silicon-based active material are contained 50 to 100 wt. %:0 to 50 wt. % based on the total weight of the negative electrode active material, the rate constant reference value for the carbon interlayer compound may be 0.0001 to 0.005 hour$^{-1}$; 0.0001 to 0.001 hour$^{-1}$; 0.0005 to 0.002 hour$^{-1}$; 0.005 to 0.1 hour$^{-1}$; 0.005 to 0.07 hour$^{-1}$; 0.005 to 0.05 hour$^{-1}$; 0.005 to 0.03 hour$^{-1}$; 0.005 to 0.02 hour$^{-1}$; 0.005 to 0.015 hour$^{-1}$; 0.005 to 0.009 hour$^{-1}$; 0.01 to 0.015 hour$^{-1}$; 0.025 to 0.04 hour$^{-1}$; or 0.030 to 0.035 hour$^{-1}$.

Furthermore, the reference value of the reaction rate constant for the decomposed product of the carbon interlayer compound (i.e., the reference value $k_{-1}$) may be 0.1 hour$^{-1}$ or less when the negative electrode active material contains 50 to 100 wt. %:0 to 50 wt. % of carbon-based active material and silicon-based active material relative to the total weight of the negative electrode active material, and more specifically, may be 0.0001 to 0.005 hour$^{1}$; 0.0001 to 0.001 hour$^{-1}$; 0.0005 to 0.002 hour$^{-1}$; 0.001 to 0.05 hour$^{-1}$; 0.001 to 0.02 hour$^{-1}$; or 0.002 to 0.01 hour$^{-1}$; 0.005 to 0.1 hour$^{-1}$; 0.005 to 0.07 hour$^{-1}$; 0.005 to 0.05 hour$^{-1}$; 0.005 to 0.03 hour$^{-1}$; 0.005 to 0.02 hour$^{-1}$; 0.005 to 0.015 hour$^{-1}$; 0.005 to 0.009 hour$^{-1}$; 0.01 to 0.015 hour$^{1}$; 0.025 to 0.04 hour$^{-1}$; or 0.030 to 0.035 hour$^{1}$.

In addition, the reference values $k_1$ and $k_{-1}$ may be provided by predicting the value when the side reaction is minimized due to the high stabilization of the secondary determination through simulation or by actually measuring the composition of the negative electrode active material in advance, but are not limited to.

Further, the step of evaluating the suitability of the material may, in some cases, be subject to a secondary determination by applying the equilibrium constant K obtained by calculating the equilibrium constant K from the reaction rate constants $k_1$ and/or $k_{-1}$, and the secondary determination may be understood as a step of verifying the primary determination. Further, the equilibrium constant K may be obtained from the ratio of the reaction rate constants $k_1$ and $k_{-1}$ ($k_1/k_{-1}$), and the reference value of the equilibrium constant K may be obtained from the ratio of the reference values of the reaction rate constants $k_1$ and $k_{-1}$.

In this case, the equilibrium constant reference value (i.e., reference value K) may be 10 or less when the negative electrode active material contains a carbon-based active material and a silicon-based active material in a ratio of 50 to 100 wt. %:0 to 50 wt. % based on the total weight of the negative electrode active material, more specifically, it may be 0.1 to 10; 0.1 to 5; 0.1 to 3; 0.5 to 2; 1 to 4.5; 5 to 10; 5.5 to 9; or 6 to 9.

In one example, when the silicon-based active material is included in the amount of greater than 0 wt % and less than or equal to 10 wt % based on the total weight of the negative electrode active material, the reaction rate constant $k_1$ reference value may be less than or equal to 0.005; or less than or equal to 0.001 hour$^{-1}$; and the equilibrium constant K reference value may be less than or equal to 1; or less than or equal to 0.1. More specifically, the reaction rate constant $k_1$ reference value may be between 0.0001 and 0.001 hour$^{-1}$; and the equilibrium constant K reference value may be between 0.001 and 0.1.

In another example, when the silicon-based active material is included in the amount of greater than 10 wt. % and less than or equal to 20 wt. % based on the total weight of the negative electrode active material, the reaction rate constant $k_1$ reference value is greater than 0.005 and less than or equal to 0.05; greater than 0.005 and less than or equal to 0.03; or greater than 0.001 hour$^{-1}$ and less than or equal to 0.03 hour$^{-1}$; and the equilibrium constant K reference value may be greater than 0.1 and less than or equal to 6; greater than 0.1 and less than or equal to 3; greater than 1 and less than or equal to 5; greater than 1 and less than or equal to 6; greater than 1 and less than or equal to 3; greater than 0.1 and less than or equal to 5. More specifically, the reaction rate constant $k_1$ reference value may be 0.005 to 0.01 hour$^{-1}$; and the equilibrium constant K reference value may be 0.1 to 3.

In yet another example, when the silicon-based active material is included in the amount of greater than 20 wt % and less than or equal to 50 wt % based on the total weight of the negative electrode active material, the reaction rate constant $k_1$ reference value may be greater than 0.05 and less than or equal to 0.1; greater than 0.03 hour$^{-1}$ and less than or equal to 0.1 hour$^{-1}$; and the equilibrium constant K reference value may be greater than 3 and less than or equal to 10; or greater than 5 and less than or equal to 10. More specifically, the reaction rate constant $k_1$ reference value may be 0.05 to 0.09 hour$^{-1}$; and the equilibrium constant K reference value may be 6 to 9.

In another example, when the silicon-based active material is included in the amount of greater than 0 wt. % and less than or equal to 20 wt. % based on the total weight of the negative electrode active material, the reaction rate constant $k_1$ may have a reference value of 0.05 or less; 0.00001 to 0.05; or 0.00001 to 0.03; and the equilibrium constant K may have a reference value of 5 or less; 0.5 to 5; or 0.5 to 3.

Meanwhile, as a negative electrode active material, the negative electrode for the secondary battery according to the present disclosure includes a carbon-based active material having carbon atoms as the main component. The carbon-based active material may comprise metal ions of the positive electrode, such as one or more of Li, Na, Mg, Ca, K, Rb, Cs, and Al, which react reversibly upon charging of the battery cell, as described above, inserted into the negative electrode. In other words, in the case of a secondary battery, the term carbon interlayer compound may refer to a material in which carbon-based material is coupled with lithium ions (Li$^+$), and in the case of a sodium secondary battery or aluminum secondary battery, it may refer to a material in which carbon-based material is coupled with sodium ions (Na$^+$) or aluminum ions (Al$^{3+}$).

The carbon-based active material may not be limited as long as it is any carbon-based active material conventionally used in the art as an active material for a negative electrode, but may include one or more among graphite, graphene, graphite, carbon nanotubes, carbon black, acetylene black, ketjen black, and carbon fiber.

Furthermore, in carbon interlayer compound, metal ions of one or more of Li, Na, Mg, Ca, and Al contained in the positive electrode may be inserted into the interlayer structure of the carbon-based active material at the time of charging the battery cell in a certain molar fraction. Specifically, in the case of a secondary battery, the carbon interlayer compound having lithium inserted into the interlayer structure of the carbon-based active material may be bound in a ratio of 5 to 7 moles of carbon atoms per mole of lithium atoms, and more specifically, in a ratio of 5.5 to 6.5 moles of carbon atoms per one mole of lithium atoms.

In one example, the carbon interlayer compounds may include one or more species selected from the group comprising of $LiC_6$, $Li_2C_{12}$, $Li_3C_{18}$, $Li_4C_{24}$, $Li_5C_{30}$, and $Li_6C_{36}$, wherein the substances may be represented by $Li_{2x}C_{12x}$ (where $2 \leq x \leq 10$).

Moreover, in the case of a sodium secondary battery, the carbon interlayer compound may be bound in a ratio of 5 to 7 moles of carbon atoms per mole of sodium atoms, and more specifically, may be bound in a ratio of 5.5 to 6.5 moles of carbon atoms per mole of sodium atoms.

In one example, the carbon interlayer compounds may include one or more species selected from the group comprising of $NaC_6$, $Na_2C_{12}$, $Na_3C_{18}$, $Na_4C_{24}$, $Na_5C_{30}$, and $Na_6C_{36}$, wherein the substances may be represented by $Na_{2x}C_{12x}$ (where $2 \leq x \leq 10$).

In addition, the active layer of the negative electrode may further include a silicon-based active material as the negative electrode active material. Such a silicon-based active material may include one or more silicon materials selected from Si, SiC, and $SiO_x$ (where $0.8 \leq x \leq 2.5$). In this case, the silicon material may contain 0 to 50 moles of one or more metals among Li, Na, Mg, and Ca per 100 moles of silicon (Si) contained in the silicon material. Furthermore, the silicon-based active material may be in the form of a composite wherein the silicon material is coated or compounded with carbon.

In one example, the silicon-based active material may be a material in which Si and $SiO_2$ are uniformly mixed.

As another example, the silicon-based active material may be a material in which $SiO_x$ (where $0.8 \leq x \leq 2.5$) is doped with no more than 10 moles of Li per 100 moles of silicon (Si) contained in $SiO_x$.

In yet another example, the silicon-based active material may be an alloy compound in which 20 to 40 moles of Al is contained in $SiO_x$ (where $0.8 \leq x \leq 2.5$) per 100 moles of silicon (Si) contained in $SiO_x$.

In yet another example, the silicon-based active material may be a composite in which Si is coated with carbon (i.e., a Si/C composite).

Further, the silicon-based active material may have a certain content ratio with the carbon-based active material that is the main component of the negative electrode active material. Specifically, the silicon-based active material may be included in the amount of 0 to 50 wt % based on the total weight of the negative electrode active material, and the remainder may be the carbon-based active material. Specifically, the silicon-based active material may be included in the amount of 0-10 wt. %; 5-10 wt. %; 10-20 wt. %; 10-15 wt. %; 15-20 wt. %; 20-50 wt. %; 20-40 wt. %; 20-30 wt. %; or 30-50 wt. %, based on the total weight of the negative electrode active material.

Negative Electrode Active Material Evaluation System for Secondary Battery

Furthermore, in an exemplary embodiment, the present disclosure provides a negative electrode active material evaluation system applied with the negative electrode active material evaluation method for a secondary battery described above.

The negative electrode active material evaluation system according to the present disclosure can evaluate the material suitability of the negative electrode active material contained in the negative electrode of a battery cell in a non-destructive manner with high reliability by applying the aforementioned negative electrode active material evaluation method.

For this purpose, the evaluation system includes: a chamber into which a fully charged battery cell is inserted; an input portion for entering the type and content ratio of negative electrode active material contained in the battery cell arranged outside the chamber and inserted into the chamber; an X-ray diffraction detecting portion mounted within the chamber for irradiating the battery cell with X-rays and detecting X-rays diffracted from the battery cell; a control portion electrically connected to the X-ray diffraction detecting portion to extract X-ray diffraction peaks for the carbon interlayer compound and/or the decomposed products thereof from the X-ray diffraction spectrum received from the battery cell, calculate an intensity integral of the extracted diffraction peaks, and calculate a reaction rate constant $k_1$ for the carbon interlayer compound and/or a reaction rate constant $k_{-1}$ for the decomposed products thereof from the calculated intensity integral.

At this time, the control portion includes a database storing reaction rate constant reference values for carbon interlayer compounds by type and content ratio of the negative electrode active material, and reaction rate constant reference values for decomposed products thereof, and can determine the material suitability of the negative electrode active material included in the battery cell by comparing the reaction rate constant reference values according to the type and content ratio of the negative electrode active material entered to the input portion with the reaction rate constant calculated from the value measured at the X-ray diffraction detecting portion.

In addition, the control portion may additionally calculate an equilibrium constant K from the calculated reaction rate constant $k_1$ for the carbon interlayer compound and/or the reaction rate constant $k_{-1}$ for the decomposed product thereof, and the calculated equilibrium constant K may be compared to the equilibrium constant reference value obtained from the reaction rate constant reference value to further validate the material suitability result evaluated using the reaction rate constant.

The negative electrode active material evaluation system for secondary batteries according to the present disclosure has the above-described configuration, which enables the material suitability of the negative electrode active material contained inside the battery cell to be evaluated in a non-destructive manner and with high accuracy.

Negative Electrode for Lithium Secondary Battery

Furthermore, in an exemplary embodiment, the present disclosure provides a negative electrode for a lithium secondary battery including a negative electrode active material determined to be suitable by the above-described evaluation method of a negative electrode active material for a secondary battery.

The negative electrode according to the present disclosure has a structure in which the negative electrode active layer is located on the negative electrode current collector, and the negative electrode composite layer may have the reaction rate constant $k_1$ and an equilibrium constant K for the carbon interlayer compound calculated by fitting the intensity integral of the X-ray diffraction peaks for the carbon interlayer compound and its decomposed products during the X-ray diffraction of the negative electrode composite layer having values of 0.1 hour$^{-1}$ or less and 10 or less, respectively, and may be determined to be suitable in the evaluation method of the present disclosure described above. The reaction rate constant $k_1$ and equilibrium constant K can be calculated by the same procedure as the evaluation method of the negative electrode active material according to the present disclosure after obtaining the X-ray diffraction spectrum.

Here, the negative electrode active material contained in the negative electrode active layer includes a carbon-based active material and a silicon-based active material, and depending on the content and/or content ratio of the silicon-based active material, the reaction rate constant $k_1$ and the equilibrium constant K for the carbon interlayer compound as calculated by X-ray diffraction analysis may differ.

Specifically, the negative electrode active layer may exhibit different X-ray diffraction analysis results depending on the composition (e.g., components and content) of the negative electrode active material, the form of the negative electrode active material, the combination of ingredients other than the negative electrode active material, the conditions under which the negative electrode active layer is formed, and the like, and the peaks corresponding to carbon interlayer compounds and their degradation products present in the negative electrode active layer may vary accordingly. The present disclosure is characterized in that when the negative electrode active layer includes a carbon-based active material and a silicon-based active material, it has a reaction rate constant $k_1$ and an equilibrium constant K for a certain range of carbon interlayer compounds depending on the content and/or content ratio of the silicon-based active material.

As an example, the negative electrode active material contained in the negative electrode active layer according to the present disclosure may have a reaction rate constant $k_1$ for carbon interlayer compounds of 0.1 hour$^{-1}$ or less when the negative electrode active material contains 0 to 50 wt. % silicon-based active material relative to the total weight of the negative electrode active material, and more specifically, may be 0.0001 to 0.005 hour$^{-1}$; 0.0001 to 0.001 hour$^{-1}$; 0.0005 to 0.002 hour$^{-1}$; 0.001 to 0.05 hour$^{-1}$; 0.001 to 0.02 hour$^1$; 0.002 to 0.01 hour$^{-1}$; 0.005 to 0.1 hour$^{-1}$; 0.005 to 0.07 hour$^{-1}$; 0.005 to 0.05 hour$^{-1}$; 0.005 to 0.03 hour$^{-1}$; 0.005 to 0.02 hour$^{-1}$; 0.005 to 0.015 hour$^{-1}$; 0.005 to 0.009 hour$^{-1}$; 0.01 to 0.015 hour$^1$; 0.025 to 0.04 hour$^{-1}$; or 0.030 to 0.035 hour$^1$.

Furthermore, the negative electrode active material contained in the negative electrode active layer according to the present disclosure may have an equilibrium constant K of 10 or less when the negative electrode active material includes 0 to 50 wt. % silicon-based active material relative to the total weight of the negative electrode active material, more specifically, may be 0.1 to 10; 0.1 to 5; 0.1 to 3; 0.5 to 2; 1 to 4.5; 5 to 10; 5.5 to 9; or 6 to 9.

In one example, the negative electrode active material may have a reaction rate constant $k_1$ of 0.005 or less; or 0.001 or less, and an equilibrium constant K of 1 or less; or 0.1 or less, provided that the negative electrode active material includes 10 wt. % or less of silicon-based active material based on the total weight.

As another example, the negative electrode active material may have a reaction rate constant $k_1$ of greater than 0.005 and less than or equal to 0.05; greater than 0.005 and less than or equal to 0.03; or greater than 0.001 and less than or equal to 0.03, and an equilibrium constant K of greater than 0.1 and less than or equal to 6; greater than 0.1 and less than or equal to 3; greater than 1 and less than or equal to 5; greater than 1 and less than or equal to 6; greater than 1 and less than or equal to 3; or greater than 0.1 and less than or equal to 5, when the negative electrode active material includes greater than 10 wt. % and less than or equal to 20 wt. % silicon-based active material based on the total weight.

In yet another example, the negative electrode active material may have a reaction rate constant $k_1$ of greater than 0.05 and less than or equal to 0.1; or greater than 0.03 and less than or equal to 0.1; and an equilibrium constant K of greater than 3 and less than or equal to 10; or greater than 5 and less than or equal to 10, when the negative electrode active material includes greater than 20 wt. % and less than or equal to 50 wt. % silicon-based active material based on the total weight.

In yet another example, the negative electrode active material may have a reaction rate constant $k_1$ of 0.05 or less; 0.00001 to 0.05; or 0.00001 to 0.03, and an equilibrium constant K of 5 or less; 0.5 to 5; or 0.5 to 3, when the negative electrode active material includes more than 0 wt. % and less than or equal to 20 wt. % silicon-based active material.

Meanwhile, the negative electrode active layer can be prepared by applying, drying, and pressing a negative electrode slurry including negative electrode active materials and a binder or the like that assists in bonding the negative electrode active materials onto a negative electrode current collector.

In this case, since the negative electrode active material includes a negative electrode active material that has been determined to be suitable by the evaluation method of the present disclosure, the negative electrode having the same has the advantage of excellent high temperature stability because the side reaction in the negative electrode active layer is significantly lower during high temperature storage in a fully charged state.

The negative electrode active material includes a carbon-based active material having a carbon atom as a main component, and the carbon-based active material may not be limited as long as it is a carbon-based active material conventionally used as a negative electrode active material in the art, but may specifically include one or more of graphite, graphene, graphite, carbon nanotubes, carbon black, acetylene black, ketjen black, and carbon fiber.

Further, the negative electrode active material may further include a silicon-based active material along with the carbon-based active material. The silicon-based active material may include one or more silicon materials selected from Si, SiC, and $SiO_x$ (where $0.8 \leq x \leq 2.5$). In this case, the silicon material may contain 0 to 50 moles of one or more metals among Li, Na, Mg, and Ca per 100 moles of silicon (Si) contained in the silicon material. Furthermore, the silicon-based active material may be in the form of a composite wherein the silicon material is coated or compounded with carbon.

In one example, the silicon-based active material may be a material in which Si and $SiO_2$ are uniformly mixed.

As another example, the silicon-based active material may be a material in which $SiO_x$ (where $0.8 \leq x \leq 2.5$) is doped with no more than 10 moles of Li per 100 moles of silicon (Si) contained in $SiO_x$.

In yet another example, the silicon-based active material may be an alloy compound in which 20 to 40 moles of Al is contained in $SiO_x$ (where $0.8 \leq x \leq 2.5$) per 100 moles of silicon (Si) contained in $SiO_x$.

In yet another example, the silicon-based active material may be a composite in which Si is coated with carbon (i.e., a Si/C composite).

Further, the silicon-based active material may have a certain content ratio with the carbon-based active material that is the main component of the negative electrode active material. Specifically, the silicon-based active material may be included in the amount of 0 to 50 wt % based on the total weight of the negative electrode active material, and the remainder may be carbon-based active material. Specifically, the silicon-based active material may be included in the amount of 0-10 wt. %; 5-10 wt. %; 10-20 wt. %; 10-15 wt. %; 15-20 wt. %; 20-50 wt. %; 20-40 wt. %; 20-30 wt. %; or 30-50 wt. %, based on the total weight of the negative electrode active material.

The negative electrode for a secondary battery according to the present disclosure not only has excellent life characteristics due to the above-described composition, but also has the advantage of excellent high temperature stability due to a significantly less side reaction in the negative electrode active layer during high temperature storage.

Hereinafter, the present disclosure will be described in more detail by way of examples and experimental examples.

However, the following examples and experimental examples are only illustrative of the present disclosure, and the contents of the present disclosure are not limited to the following examples and experimental examples.

Examples 1 to 2 and Comparative Example 1. Evaluating Material Suitability of Negative Electrode Active Materials Assembled in a Battery Cell Preparation of a Battery Cell The negative electrode active material was prepared by mixing natural graphite, a carbon-based active material, with silicon particles (SiO, purity: >99.8%), a silicon-based active material, where the content of silicon particles (i.e., silicon-based active material) in the negative electrode active material was adjusted as shown in Table 1 based on the total weight of the negative electrode active material.

Then, a negative electrode slurry was prepared by mixing 3 parts by weight of styrene-butadiene rubber (SBR) as a binder and 0.5 parts by weight of an additive to 100 parts by weight of the negative electrode active material. Here, additive A and additive B were used as the additive of the examples and the additive of the comparative example, respectively. The prepared negative electrode slurry was coated on one side of a 10 cm×20 cm copper current collector and dried to form a negative electrode composite layer (average thickness: 120 μm). At this time, the temperature of the circulating air was 80° C. Then, the negative electrode was prepared by roll pressing and drying in a vacuum oven at 130° C. for 12 hours.

Separately, a positive electrode slurry was prepared by injecting N-methylpyrrolidone solvent into a homo mixer, weighing and adding 2 parts by weight of carbon black, a conductor, and 2 parts by weight of PVdF, a binder, to 100 parts by weight of $LiNi_{0.8}Co_{0.1}Mn_{0.1}O_2$, a positive electrode active material, and mixing at 3,000 rpm for 60 min. The prepared positive electrode slurry was coated and dried on one side of a 10 cm×20 cm aluminum current collector to form a positive electrode composite layer (average thickness: 150 μm). At this time, the temperature of the circulating air was 80° C. The positive electrode was then prepared by roll pressing and drying in a vacuum oven at 130° C. for 12 hours.

Then, a separator comprising of a porous polyethylene (PE) film (thickness: about 16 μm) was interposed between the prepared positive electrode and each of the previously prepared negative electrodes, and E2DVC was injected as the electrolyte to produce a full cell type pouch cell.

Herein, "E2DVC" refers to a solution of lithium hexafluorophosphate (LiPF6, 1.0 M) and vinyl carbonate (VC, 2 wt %) in a mixture of ethylene carbonate (EC):dimethyl carbonate (DMC):diethyl carbonate (DEC)=1:1:1 (volume ratio), which is a type of carbonate-based electrolyte.

The prepared battery cells were subjected to a constant current (CC) charge to a voltage of 4.25 V with a current of 0.3 C at a temperature of 25° C., followed by a constant voltage (CV) charge with a current of 0.05 C, and then a constant current (CC) discharge to 2.5 V with a current of 0.3 C. The above process was performed three times in total. The discharged battery cells were then charged with 4.25 V to 100% SOC.

Primary Determination of Negative Electrode Active Material Suitability

Each charged battery cell was then fixed to a jig inside the high temperature chamber for pouch cell transmission X-ray diffraction, and the X-ray diffraction was aligned to the position of the current collector peak through a 20 scan on the X-ray diffraction stage. The sample standards of the diffraction peaks for copper and aluminum as current collectors were adjusted to match their positions in the database, and the temperature of the oven was set to 60° C. in the adjusted state to induce a high temperature environment. The X-ray diffraction of the pouch cell was measured when the temperature inside the oven reached 60° C., and the X-ray diffraction of the pouch cell was measured at 6-hour intervals thereafter.

The diffraction peaks of the carbon interlayer compound (specifically, $LiC_6$) were extracted from the measured X-ray diffraction, and the intensities of the extracted peaks were integrated over time, plotted against time, and fitted with the ratio $(c_6(t)/c_6(0))$ of the initial concentration of the carbon interlayer compound $(c_6(0))$ to the concentration of the carbon interlayer compound $(c_6(t))$ at time t according to Equation 1. In this case, a in Equation 1 was adjusted to 0.36±0.06 and b was adjusted to 5.3±2.0. Furthermore, the reaction rate constant $k_1$ of the carbon interlayer compound was calculated from the fitted results, and the results are shown in FIGS. 1 and 2 and Table 1. In FIG. 1, the concentration ratio $(c_6(t)/c_6(0))$ calculated from the X-ray diffraction results was plotted as a dot over time, and the graph according to Equation 1 was plotted as a line:

$$\frac{c_6(t)}{c_6(0)} = 1 - \frac{\alpha\left(1 - e^{-kt}\right)}{c_6(0)\left[1 + \left(\frac{\alpha}{b}\right)e^{-kt}\right]} \qquad \text{[Equation 1]}$$

in Equation 1, $c_6(0)$ represents the initial concentration of the carbon interlayer compound, $c_6(t)$ represents the concentration of the carbon interlayer compound at time t, a and b represent constants for time, t represents the storage elapsed time, and k represents the effective reaction rate constant.

TABLE 1

| | Silicon-based active material content | Reaction rate constant $k_1$ (unit: hour$^{-1}$) |
|---|---|---|
| Example 1 | 5 wt. % | 0.000517 ± 0.00005 |
| Example 2 | 15 wt. % | 0.0107 ± 0.0005 |
| Example 3 | 40 wt. % | 0.0694 ± 0.0005 |
| Comparative Example 1 | 15 wt. % | 0.0234 ± 0.0005 |

The calculated reaction rate constant, $k_1$, was compared to the reaction rate constant reference value to primarily determine the suitability of the negative electrode active material. In this case, the reference value was applied according to the content of silicon monoxide (SiO), a silicon-based active material, as shown in Table 2 below.

TABLE 2

| Silicon-based active material content range | Reference value $k_1$ (unit: hour$^{-1}$) |
| --- | --- |
| Less than or equal to 10 wt. % | Less than or equal to 0.1 |
| Greater than 10 wt. % and less than or equal to 20 wt. % | Greater than 0.001 and less than or equal to 0.03 |
| Greater than 20 wt. % and less than or equal to 50 wt. % | Greater than 0.03 and less than or equal to 0.1 |

Based on the primary determination of the negative electrode active materials, it was determined that the negative electrode active materials of Examples 1 to 3 and Comparative Example 1 have reaction rate constant values for carbon interlayer compounds that satisfy the reference values.

Secondary Determination of Negative Electrode Active Material Suitability

The equilibrium constant K was calculated as shown in Table 3 below using the reaction rate constant $k_1$ calculated in the Examples and Comparative Example, respectively, and the obtained equilibrium constant K was compared with the equilibrium constant reference value to secondarily determine the suitability of the negative electrode active material.

TABLE 3

| | Equilibrium constant K |
| --- | --- |
| Example 1 | 0.0438 ± 0.005 |
| Example 2 | 1.14 ± 0.1 |
| Example 3 | 6.7 ± 0.1 |
| Comparative Example 1 | 5.1 ± 0.1 |

In this case, the reference value K was applied according to the content of silicon monoxide (SiO), a silicon-based active material, as shown in Table 4 below.

TABLE 4

| Silicon-based active material content range | Reference value K |
| --- | --- |
| Less than or equal to 10 wt. % | Less than or equal to 0.1 |
| Greater than 10 wt. % and less than or equal to 20 wt. % | Greater than 0.1 and less than or equal to 5 |
| Greater than 20 wt. % and less than or equal to 50 wt. % | Greater than 5 and less than or equal to 10 |

As a result of the secondary determination of the negative electrode active materials, the negative electrode active materials applied to the battery cells of Examples 1 to 3 were evaluated as "suitable" as negative electrode materials for lithium secondary batteries because the equilibrium constant K met the reference value. On the other hand, the equilibrium constant value of the negative electrode active material applied to the battery cell of Comparative Example 1 did not meet the reference value. The fact that the equilibrium constant value of the negative electrode active material in Comparative Example 1 did not meet the reference value means that a side reaction may occur during the charging and discharging process after activation, which reduces the concentration of lithium ions in the graphite, and the battery may show a strong tendency to degrade. Therefore, the negative electrode active material applied to the battery cell in Comparative Example 1 is evaluated as "unsuitable" as a negative electrode material for lithium secondary batteries.

Experimental Example

To verify the results determined in the Examples and Comparative Example, the battery cells used in Example 2 and Comparative Example 1 with the same content of silicon-based active materials were subjected to 100 repeated charge and discharge cycles at 45° C. and 0.3 C respectively, and the charge and discharge capacity was measured, and the charge and discharge capacity retention rate was calculated after 100 cycles. The results are shown in Table 5 below.

TABLE 5

| | Capacity retention rate after 100 charge/discharge cycles |
| --- | --- |
| Example 2 | Approx. 92.5% |
| Comparative Example 1 | Approx. 86.7% |

Looking at Table 5, it is confirmed that the battery cells of the Examples that was determined to be suitable as a negative electrode material for a lithium secondary battery according to the present disclosure exhibits a high capacity retention rate of more than about 92% even after 100 charge/discharge cycles, while the battery cell of the Comparative Example that was determined to be unsuitable as a negative electrode material exhibits a low capacity retention rate of less than about 87% after 100 charge/discharge cycles.

From these results, the negative electrode active material determination method for lithium secondary batteries according to the present disclosure can quantify the degree of side reaction of the negative electrode active layer that may occur after activation, and can determine the degradation tendency of the negative electrode active material with high reliability, and the negative electrode determined suitable by the determination method can be found to have excellent life characteristics and high temperature stability.

Although the above has been described with reference to a preferred exemplary embodiment of the present disclosure, it will be understood by those skilled in the art or having ordinary knowledge of the art that various modifications and changes can be made to the present disclosure without departing from the ideas and technical scope of the present disclosure described in the following claims.

Accordingly, the technical scope of the present disclosure is not limited to what is described in the detailed description of the specification, but should be defined by the patent claims.

The invention claimed is:

1. An evaluation method of negative electrode active material for secondary battery comprising:

measuring an X-ray diffraction of a battery cell stored in a charged state;

calculating intensity integrals of extracted diffraction peaks, wherein the extracted diffraction peaks are extracted from X-ray diffraction peaks for a carbon interlayer compounds and a decomposed products contained respectively in a negative electrode active layer of a negative electrode from the measured X-ray diffraction;

calculating a reaction rate constant $k_1$ for the carbon interlayer compounds or a reaction rate constant $k_{-1}$ for the decomposed products of the carbon interlayer compounds from the calculated intensity integral; and evaluating a material suitability of the negative electrode active material contained in the negative electrode active layer based on the calculated reaction rate constant.

2. The evaluation method of negative electrode active material for secondary battery of claim 1, wherein the reaction rate constant $k_1$ and the reaction rate constant $k_{-1}$ depend on a reaction represented by Chemical Equation 1 below:

$$Li_xC_{6x} \leftrightarrow Li_{x-1}C_{6x} + Li \qquad \text{[Chemical Equation 1]}$$

wherein, in Chemical Equation 1, x is an integer from 2 to 10.

3. The evaluation method of negative electrode active material for secondary battery of claim 1, wherein the reaction rate constant $k_1$ for a carbon interlayer compounds is calculated by fitting the intensity integral of the diffraction peak for the carbon interlayer compounds to a following Equation 1:

$$\frac{c_6(t)}{c_6(0)} = 1 - \frac{\alpha\left(1 - e^{-kt}\right)}{c_6(0)\left[1 + \left(\frac{\alpha}{b}\right)e^{-kt}\right]} \qquad \text{[Equation 1]}$$

wherein, in Equation 1, $C_6(0)$ represents an initial concentration of the carbon interlayer compound, $C_6(t)$ represents a concentration of the carbon interlayer compound at time t, a and b represent constants for time, t represents a storage elapsed time, and k represents an effective reaction rate constant.

4. The evaluation method of negative electrode active material for secondary battery of claim 3, wherein a of Equation 1 is 0 to 1; and b of Equation 1 is 0 to 10.

5. The evaluation method of negative electrode active material for secondary battery of claim 1, wherein the reaction rate constant $k_{-1}$ for a decomposed product of a carbon interlayer compound is calculated by fitting the intensity integral of the diffraction peak of the decomposed product to a following Equation 2:

$$\frac{c_{12}(t)}{c_{12}(0)} = 1 + \frac{\alpha\left(1 - e^{-kt}\right)}{c_{12}(0)\left[1 + \left(\frac{\alpha}{b}\right)e^{-kt}\right]} \qquad \text{[Equation 2]}$$

wherein, in Equation 2, $C_{12}(0)$ represents an initial concentration of the decomposed product, $C_{12}(t)$ represents a concentration of the decomposed product at time t, a and b represent constants for time, t represents a storage elapsed time, and k represents an effective reaction rate constant.

6. The evaluation method of negative electrode active material for secondary battery of claim 5, wherein a of Equation 2 is 0 to 1; and b of Equation 2 is 0 to 10.

7. The evaluation method of negative electrode active material for secondary battery of claim 1, wherein evaluating the material suitability of the negative electrode active material comprises:

primarily determining the negative electrode active material of the negative electrode active layer as a suitable material when the calculated reaction rate constants $k_1$ or $k_{-1}$ satisfies a first reference value when compared to the first reference value, respectively;

calculating an equilibrium constant K from the calculated reaction rate constants $k_1$ or $k_{-1}$; and secondarily determining the negative electrode active material of the negative electrode active layer as a suitable material when the calculated equilibrium constant K satisfies a second reference value when compared to the second reference value.

8. The evaluation method of negative electrode active material for secondary battery of claim 7, wherein the first reference value of reaction rate constant $k_1$ and the first reference value of reaction rate constant $k_{-1}$ are 0.1 hour$^{-1}$ or less, respectively.

9. The evaluation method of negative electrode active material for secondary battery of claim 7, wherein the second reference value of equilibrium constant K is 10 or less.

10. The evaluation method of negative electrode active material for secondary battery of claim 1, wherein the carbon interlayer compounds are compounds bound with a ratio of 5 to 7 moles of carbon atoms to 1 mole of lithium atoms.

11. The evaluation method of negative electrode active material for secondary battery of claim 1, wherein a carbon interlayer compound is at least one selected from the group comprising of $LiC_6$, $Li_2C_{12}$, $Li_3C_{18}$, $Li_4C_{24}$, $Li_5C_{30}$, and $Li_6C_{36}$.

12. The evaluation method of negative electrode active material for secondary battery of claim 1, wherein storage of battery cell is performed below 150° C.

13. The evaluation method of negative electrode active material for secondary battery of claim 1, wherein the negative electrode comprises, one or more of the following carbon-based active materials: graphite, graphene, graphite, carbon nanotubes, carbon black, acetylene black, ketjen black, and carbon fiber; and one or more of the following silicon-based active materials: Si, SiC, and $SiO_x$, where $0.8 \leq x \leq 2.5$.

14. The evaluation method of negative electrode active material for secondary battery of claim 1, wherein in a case of including 50 wt. % or less of silicon-based active material based on a total weight of the negative electrode active material, a first reference value of the reaction rate constant $k_1$ is 0.1 hour$^{-1}$ or less; and a second reference value of the equilibrium constant K is 10 or less.

15. The evaluation method of negative electrode active material for secondary battery of claim 1, wherein in a case of including 20 wt. % or less of silicon-based active material based on a total weight of the negative electrode active material, a first reference value of the reaction rate constant $k_1$ is 0.05 hour$^{-1}$ or less; and a second reference value of the equilibrium constant K is 5 or less.

16. A negative electrode for secondary battery comprising:

carbon-based active materials and silicon-based active materials as a negative electrode active material, wherein the negative electrode active material determined to be suitable by an evaluation method according to claim 1.

17. The negative electrode for secondary battery of claim 15, wherein when the negative electrode active material includes 50 wt. % or less of silicon-based active material based on total weight, the reaction rate constant $k_1$ of the negative electrode active material is 0.1 hour$^{-1}$ or less and an equilibrium constant K of the negative electrode active material is 10 or less.

18. The negative electrode for secondary battery of claim 16, wherein when the negative electrode active material includes 20 wt. % or less of silicon-based active material based on total weight, the reaction rate constant $k_1$ of the negative electrode active material is 0.05 hour$^{-1}$ or less and an equilibrium constant K of the negative electrode active material is 5 or less.

\* \* \* \* \*